United States Patent
Vaccaro

(12) 
(10) Patent No.: US 7,080,816 B1
(45) Date of Patent: Jul. 25, 2006

(54) RAISABLE PEDESTAL CONTAINING ELECTRONIC COMPONENTS AND WATER SENSOR FOR AUTOMATICALLY LOWERING THE SAME IN THE PRESENCE OF PRECIPITATION

(76) Inventor: Andrew Vaccaro, 39 Morningside Ave., North Haledon, NJ (US) 07508

( * ) Notice: Subject to any disclaimer, the term of this patent is extended or adjusted under 35 U.S.C. 154(b) by 204 days.

(21) Appl. No.: 10/754,871

(22) Filed: Jan. 9, 2004

(51) Int. Cl.
*F16M 13/00* (2006.01)

(52) U.S. Cl. ......................... 248/545; 248/530; 248/544

(58) Field of Classification Search ................ 248/545, 248/530, 156, 544; 362/153.1
See application file for complete search history.

(56) References Cited

U.S. PATENT DOCUMENTS

| | | | |
|---|---|---|---|
| 3,674,108 A | | 7/1972 | Beatty |
| 3,856,092 A | * | 12/1974 | Mann .......................... 173/122 |
| 4,180,850 A | * | 12/1979 | Bivens ........................ 362/285 |
| 4,556,835 A | | 12/1985 | Vogel et al. |
| 4,754,852 A | | 7/1988 | Mule et al. |
| 4,949,386 A | | 8/1990 | Hill |
| 4,974,134 A | * | 11/1990 | Bourne ........................ 362/286 |
| 4,984,139 A | * | 1/1991 | Goggia ..................... 362/153.1 |
| 5,003,441 A | | 3/1991 | Crowe et al. |
| 5,068,773 A | * | 11/1991 | Toth ............................ 362/386 |
| 5,072,345 A | * | 12/1991 | Goggia ..................... 362/153.1 |
| 5,075,834 A | | 12/1991 | Puglisi |
| 5,130,916 A | * | 7/1992 | Toth ............................ 362/386 |
| 5,142,463 A | | 8/1992 | Panagotacos et al. |
| 5,147,980 A | | 9/1992 | Ferguson, Jr. |
| 5,321,760 A | | 6/1994 | Gray |
| 5,628,558 A | * | 5/1997 | Iacono et al. ................ 362/288 |
| 5,802,193 A | | 9/1998 | Kieltyka |
| 5,838,537 A | | 11/1998 | Lindgren et al. |
| 6,061,975 A | | 5/2000 | Craft, Jr. |
| 6,218,741 B1 | | 4/2001 | Braun et al. |
| 6,338,596 B1 | | 1/2002 | Galeazzi et al. |
| 6,405,891 B1 | | 6/2002 | Christensen et al. |
| 6,468,126 B1 | | 10/2002 | Herber |
| 6,575,117 B1 | | 6/2003 | Rasmussen |
| 2001/0036354 A1 | | 11/2001 | Majors |

* cited by examiner

*Primary Examiner*—Robert P. Olszewski
*Assistant Examiner*—Steven Marsh
(74) *Attorney, Agent, or Firm*—Richard M. Goldberg

(57) ABSTRACT

A raisable pedestal includes an enclosed housing fixed to a ground surface; guide rods mounted within the housing; an inner shell mounted for movement along the guide rods between a retracted position entirely within the housing and an extended position extending out from the housing, the inner shell including an arrangement for supporting electronic components in a manner to render the electronic components accessible when the inner shell extends out from the housing; a piston for moving the inner shell along the guide rods between the retracted and extended positions; a rain sensor mounted on an upper end of the housing for detecting precipitation; and a control connected with the sensor for controlling the piston to move the inner shell to the retracted position when the sensor detects precipitation.

13 Claims, 5 Drawing Sheets

RAISABLE PEDESTAL CONTAINING ELECTRONIC COMPONENTS AND WATER SENSOR FOR AUTOMATICALLY LOWERING THE SAME IN THE PRESENCE OF PRECIPITATION

BACKGROUND OF THE INVENTION

The present invention relates generally to electronic control devices for use in the outdoors, and more particularly, is directed to a raisable pedestal containing electronic components and a water sensor for automatically lowering the same in the presence of precipitation.

Conventionally, electronic control devices used in the outdoors are exposed to the elements. For this reason, these devices are generally protected from the elements by covers and the like. However, these covers must generally be manually closed by a person to protect the same from the elements.

Rain sensors are also known, for example, for use with sprinkler systems, automobile windshield wipers, etc. In other words, when rain is sensed, the sprinkler system is automatically turned off or the windshield wipers are activated.

However, it would be desirable to provide an electronic control device used in the outdoors which can be automatically protected when rain or other precipitation is sensed.

SUMMARY OF THE INVENTION

Accordingly, it is an object of the present invention to provide a raisable pedestal containing electronic components that can be used outdoors, that overcomes the problems with the aforementioned prior art.

It is another object of the present invention to provide a raisable pedestal containing electronic components that can be used outdoors, and includes a water sensor for automatically lowering the same in the presence of precipitation.

It is still another object of the present invention to provide raisable pedestal containing electronic components that can be used outdoors, which is sealed and/or non-accessible in its lowered position.

It is yet another object of the present invention to provide a raisable pedestal containing electronic components that can be used outdoors, which has a safety arrangement to prevent crushing a person's hand during a lowering operation.

It is a further object of the present invention to provide a raisable pedestal containing electronic components that can be used outdoors, in which all electronics are safely hidden in the lowered position.

It is a further object of the present invention to provide a raisable pedestal containing electronic components that can be used outdoors, that is easy and economical to use and manufacture.

In accordance with an aspect of the present invention, a raisable pedestal includes an enclosed housing fixed to a ground surface and a guide arrangement mounted within the housing. An inner support is mounted for movement along the guide arrangement between a retracted position entirely within the housing and an extended position extending out from the housing. The inner support includes an arrangement for supporting electronic components in a manner to render the electronic components accessible when the inner support extends out from the housing. A driving arrangement moves the inner support along the guide arrangement between the retracted and extended positions. A control is connected with the driving arrangement for controlling the driving arrangement to move the inner support between the retracted and extended positions.

The guide arrangement includes a plurality of guide rods extending upwardly relative to the ground surface.

The inner support includes a shell slidably along the guide rods. Specifically, the shell includes side walls and at least one opening in a front wall thereof for receiving the electronic components, and the arrangement for supporting the electronic components includes a rack connected to at least one side wall of the shell adjacent the at least one opening. The shell also includes a top plate which closes off an upper end of the enclosed housing when the inner support is in the retracted position, with a seal therearound for providing a seal between the top plate and the upper end of the enclosed housing.

In one embodiment, the driving arrangement is movable with the inner support along the guide arrangement, and further includes a spring arrangement positioned below the inner shell for providing a counter-balance to the inner support to prevent crushing of an item placed between the inner support and the housing when the inner support is moved to the retracted position.

There is also at least one switch for controlling the driving arrangement to move the inner support between the retracted and extended positions.

Preferably, the driving arrangement includes a piston having an extensible and retractable rod having a free end connected with the inner shell for moving the inner shell along the guide rods between the retracted and extended positions.

In accordance with another aspect of the present invention, a raisable pedestal includes an enclosed housing fixed to a ground surface and a guide arrangement mounted within the housing. An inner support is mounted for movement along the guide arrangement between a retracted position entirely within the housing and an extended position extending out from the housing. The inner support includes an arrangement for supporting electronic components in a manner to render the electronic components accessible when the inner support extends out from the housing. A driving arrangement moves the inner support along the guide arrangement between the retracted and extended positions. A precipitation sensor is mounted on either the housing or the inner support, for detecting precipitation; and a control is connected with the sensor and the driving arrangement for controlling the driving arrangement to move the inner support between the retracted and extended positions, when said sensor detects precipitation.

Preferably, the precipitation sensor is mounted to the upper end of the housing and covered by the top plate when the inner support is in the retracted position.

In accordance with still another aspect of the present invention, a raisable pedestal includes an enclosed housing fixed to a ground surface; and a plurality of guide rods extending upwardly relative to the ground surface and mounted within the housing. An inner support is mounted for movement along the guide arrangement between a retracted position entirely within the housing and an extended position extending out from the housing. The inner support includes side walls, at least one opening in a front wall thereof for receiving electronic components, a rack connected to at least one side wall adjacent the at least one opening, in a manner to render the electronic components accessible when the inner support extends out from the housing, and a top plate which closes off an upper end of the enclosed housing when the inner support is in the retracted position. A driving arrangement moves the inner support along the guide arrangement between the retracted and extended positions. A precipitation sensor is mounted on either the housing or inner support, for detecting precipitation; and a control is connected with the sensor and the driving arrangement for controlling the driving arrangement to move the inner support to the retracted position when the sensor detects precipitation.

In accordance with still another aspect of the present invention, a raisable pedestal includes an enclosed housing fixed to a ground surface; and a plurality of guide rods extending upwardly relative to the ground surface and mounted within the housing; an inner support mounted for movement along the guide arrangement between a retracted position entirely within the housing and an extended position extending out from the housing. The inner support includes a shell having side walls and at least one opening in a front wall thereof for receiving electronic components, a rack connected to at least one side wall adjacent the at least one opening, in a manner to render the electronic components accessible when the inner support extends out from the housing, a top plate which closes off an upper end of the enclosed housing when the inner support is in the retracted position, and a seal at an underside of the top plate for providing a seal between the top plate and the upper end of the enclosed housing. A driving arrangement moves the inner support along the guide arrangement between the retracted and extended positions, the driving arrangement including a piston having an extensible and retractable rod having a free end connected with the inner shell for moving the inner shell along the guide rods between the retracted and extended positions. A precipitation sensor is mounted to an upper end of the housing for detecting precipitation and is covered by the top plate when the inner support is in the retracted position; and a control is connected with the sensor and the driving arrangement for controlling the driving arrangement to move the inner support to the retracted position when the sensor detects precipitation. There is also at least one switch for controlling the driving arrangement to move the inner support between the retracted and extended positions.

The above and other objects, features and advantages of the invention will become readily apparent from the following detailed description thereof which is to be read in connection with the accompanying drawings.

DETAILED DESCRIPTION

Figure 1:
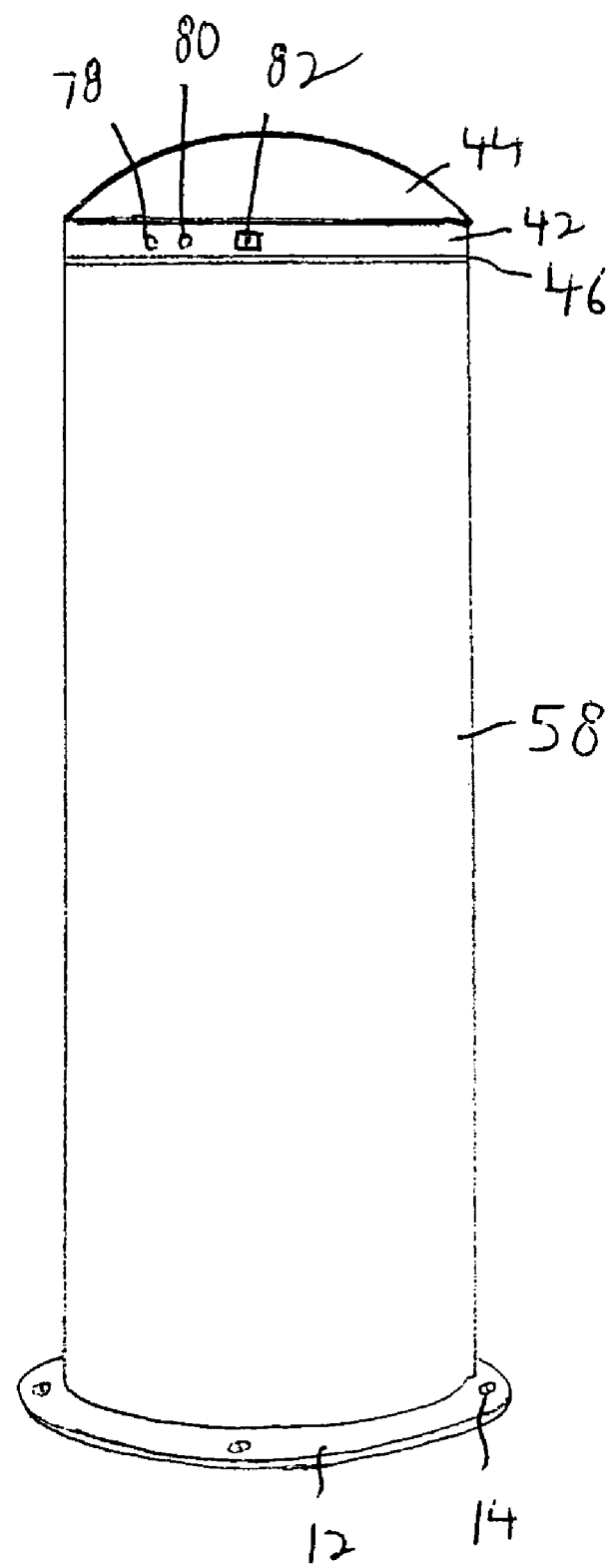
FIG. 1 is a perspective view of a raisable pedestal containing electronic components in its lowered, protective position.

Referring to the drawings in detail, a raisable pedestal 10 according to the present invention includes a flat securing ring 12, preferably made of a metal material, and having four equiangularly spaced openings 14 for fixing securing ring 12 to a hard ground surface, such as a concrete area, by bolts 16. Four guide rods 18 have their lower ends fixed to the upper surface of securing ring 12 and extend upwardly therefrom in parallel, equiangularly spaced relation. Although four guide rods 18 are shown, it will be appreciated that the present invention is not limited to this number of guide rods 18. A vertically oriented cross plate 20 is slidably mounted between two diametrically opposite guide rods 18, the purpose for which will be made apparent from the discussion hereafter.

Figure 4:
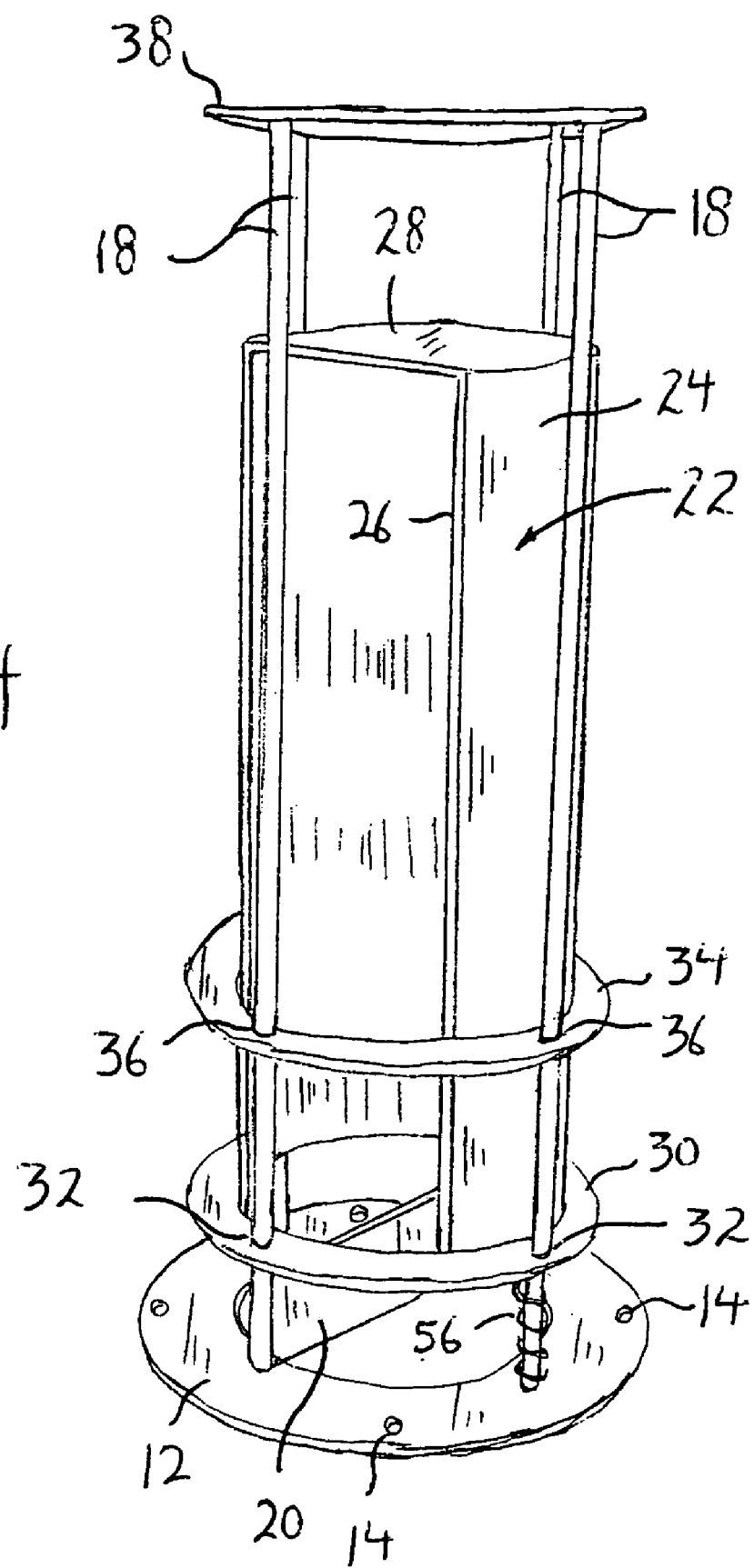
FIG. 4 is a perspective view of a portion of the raisable pedestal.
Figure 5:
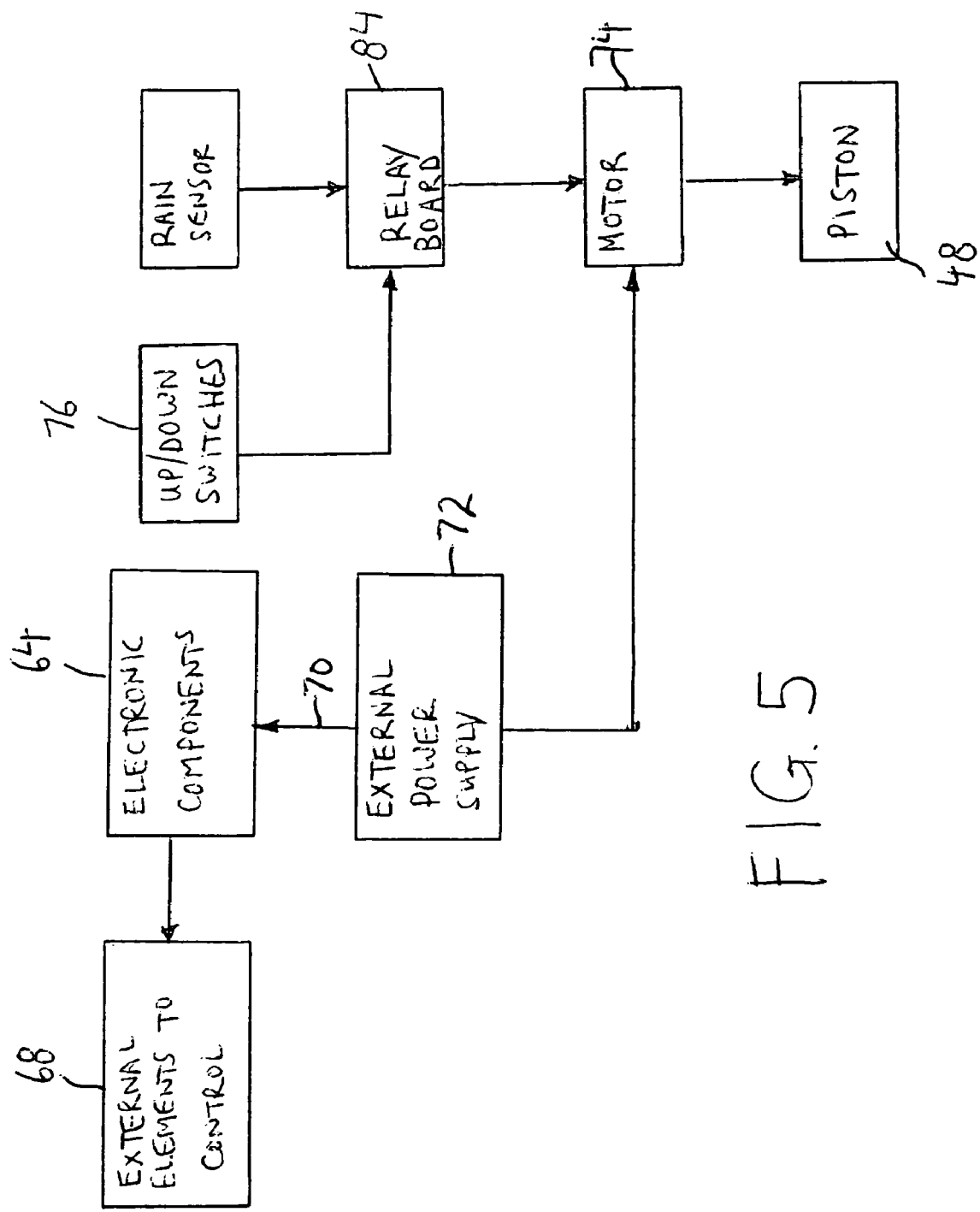
FIG. 5 is a block diagram of the electrical connections of the raisable pedestal.

As best shown in FIG. 4, raisable pedestal 10 includes a raisable inner support 22 in the form of a part-cylindrical shell 24 that extends for an angle in the range of approximately 180 degrees to 270 degrees, so as to present an open side 26 thereof. Shell 24 is closed at its upper end by a part-circular top wall 28 of the same angular dimensions as shell 24. An annular ring 30 having an inner diameter equal to the outer diameter of shell 24, is secured to the lower end of shell 24 by any suitable means, such as welding. Annular ring 30 has four equiangularly spaced openings 32 that slidably receive guide rods 18 in order to permit vertical sliding movement of inner support 22 along guide rods 18. To further reinforce this sliding movement, a further annular ring 34 is secured to the outer surface of shell 24 by any suitable means, such as welding. Annular ring 34 has four equiangularly spaced openings 36 that slidably receive guide rods 18 in order to permit vertical sliding movement of inner support 22 along guide rods 18.

The upper ends of guide rods 18 are fixed to a circular upper plate 38 having a central opening 40 of the same outer dimensions as shell 24 and through which inner support 22 can be raised so as to extend thereabove.

A circular top plate 42 is mounted on part-circular top wall 28 and can include a domed top 44 so that precipitation does not remain on the upper surface thereof. In this manner, when circular top plate 42 is positioned on upper plate 38, the downward travel of raisable inner support 22 is limited. In this regard, it will be appreciated that the position shown in FIG. 4 would never be achieved except during initial manufacture, and is only shown for illustration purposes. The underside of top plate 42, at the periphery thereof, includes a gasket 46 that seals against the upper surface of upper plate 38 to prevent precipitation from entering into raisable pedestal in the closed position shown in FIG. 1.

Figure 2:
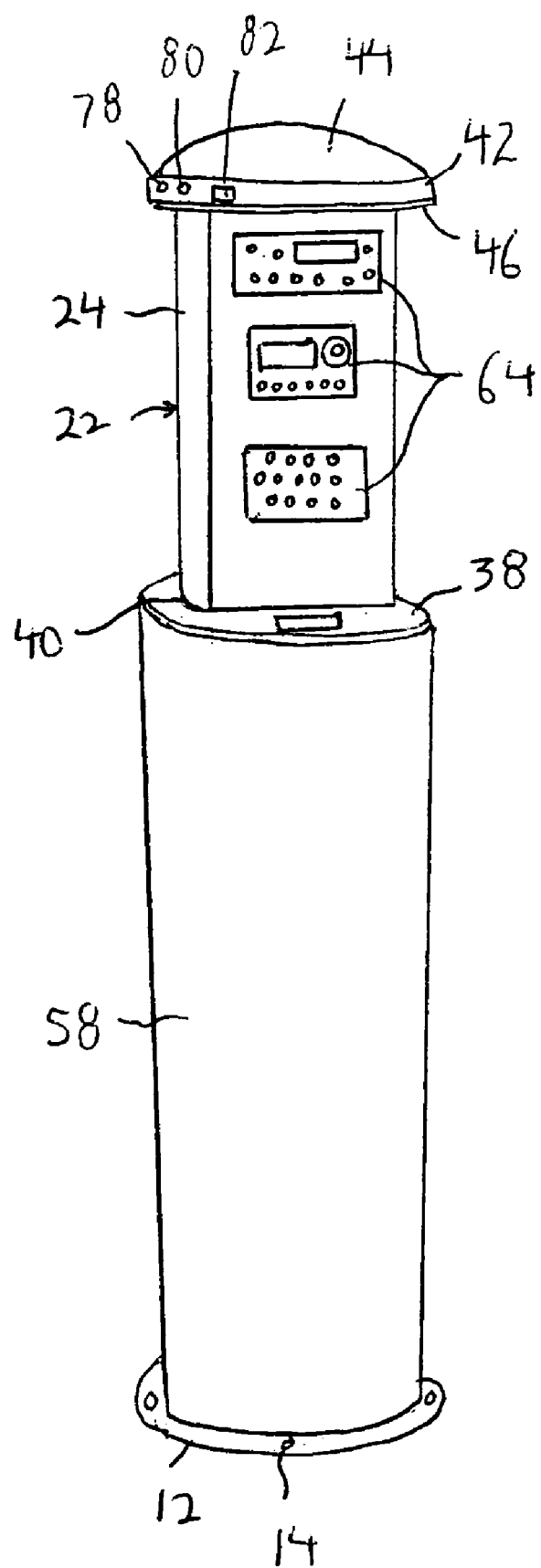
FIG. 2 is a perspective view of a raisable pedestal containing electronic components in its raised, operative protective position.
Figure 3:
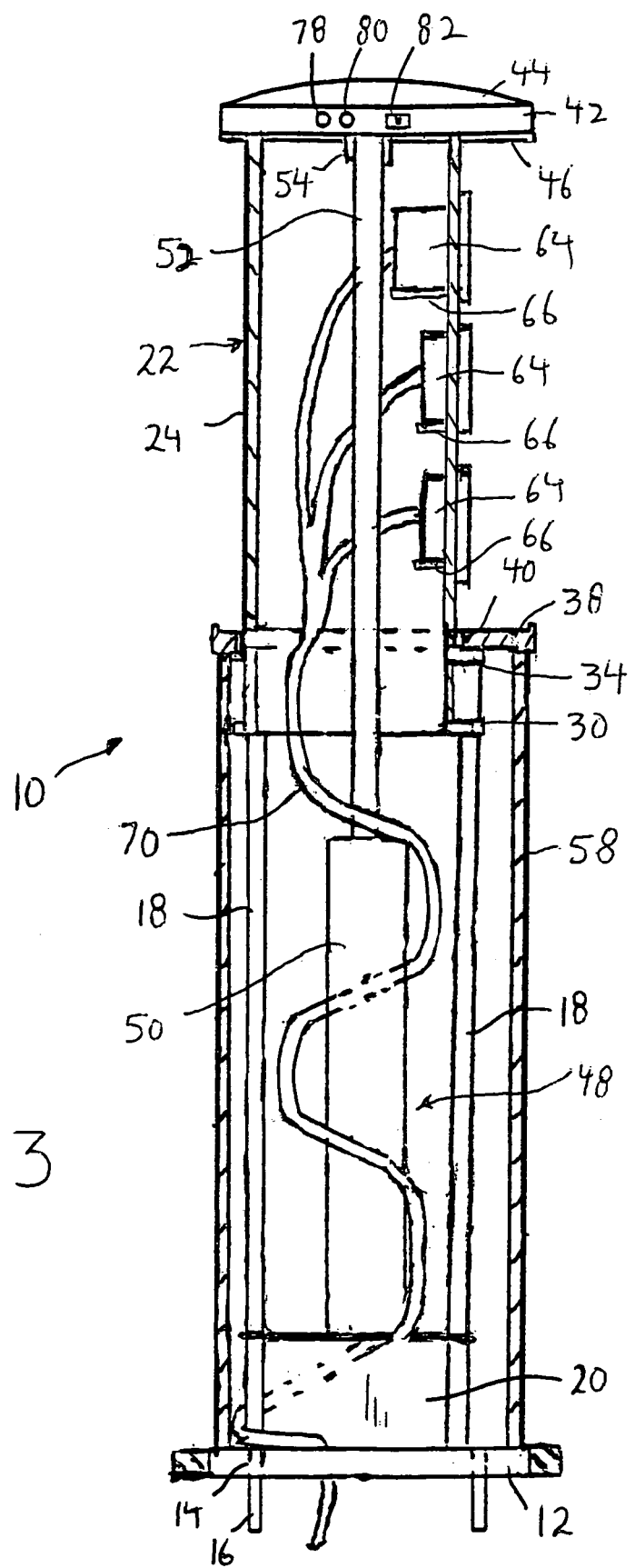
FIG. 3 is a vertical cross-sectional view of the raisable pedestal of FIG. 2.

As shown in FIG. 3, in order to raise and lower inner support 22 along guide rods 18, a piston 48 is mounted on cross plate 20. Specifically, piston 48 includes a cylinder 50 mounted on cross plate 20, and a reciprocable rod 52 extending vertically upwards therefrom, with the upper end of rod 52 mounted within a boss 54 at the underside of part-circular top wall 28. In this manner, as rod 52 is extended upwardly, inner support 22 is raised from the position shown in FIG. 1 to the position shown in FIG. 2, and when retracted, is returned to the position shown in FIG. 1.

Of course, it will be appreciated that any other suitable arrangement can be used in place of piston 48, such as a solenoid, a screw drive, etc.

In order to prevent crushing of a person's hand or any article placed between upper plate 38 and circular top plate 42 during retraction of inner support 22, coil springs 56 are positioned around the other two diametrically opposite guide rods 18 that are not connected by cross plate 20, at a position between securing ring 12 and annular ring 30. In this manner, when inner support 22 is lowered to its retracted position, coil springs 56 will compress. However, if there is a person's hand or other article between upper plate 38 and circular top plate 42, coil springs 56 will provide sufficient counter-balance to prevent crushing of the same. Specifically, in such case, coil springs 56 will provide a counter-balance to the weight of the entire assembly of cross plate 20, inner shell 22, piston 48 and electronic components 64. It will be appreciated that this embodiment will be particularly used at an individual's residence to prevent injury to a person, but that a commercial model at a business will eliminate coil springs 56, and have cross plate 20 fixed relative to guide rods 18 to prevent mischievous tampering with the same.

The stationary portion of raisable pedestal, that is, guide rods 18 and upper plate 38 are surrounded by a cylindrical outer shell housing 58 to prevent access to inner support 22 in the retracted position. Outer shell housing 58 is secured to flat securing ring 12 at its lower end and to upper plate 38 at its upper end by any suitable means, such as welding or the like.

The front face of inner support 22 at open side 26 is closed off by a face plate 60 having various openings 62 therein for receiving electronic components 64 therethrough. Electronic components 64 are held by any suitable means therein. For example, shelves or racks 66 can be secured to the inner sides of shell 24 adjacent open side 26. Preferably, electronic components 64 are secured by bolts or other means to face plate 60 in a manner to prevent mischievous removal thereof.

Electronic components 64 can be any suitable components for outdoor use, such as stereo equipment, lighting controls, pool controls, and which are used to control external elements 68. For example, with respect to stereo equipment, electronic components 64 would be connected to loudspeakers as the external elements 68. For lighting controls, the external elements 68 would be outdoor or indoor lights. For pool controls, the external elements 68 could include pool lights, a pool heater, etc.

Power is supplied to electronic components 64 by a power line 70 that extends in a winding manner through the inside of raised pedestal 10 and exits through the central opening in flat securing ring 12, so as to be connected to an external power supply 72. External power supply 72 is also connected to a motor 74 that controls raising and lowering of piston 48. For example, motor 74 would supply fluid to the respective opening in the upper end or lower end of cylinder 48 to move a piston head (not shown) therein so as to lower or raise rod 52 in a manner well known. Motor 74 is preferably positioned in raisable pedestal 10, for example, to one side of cross plate 20.

In order to raise and lower inner support 22, UP/DOWN switches 76 are provided. Specifically, there is an UP button 78 at the side of circular top plate 42, and a DOWN button 80 at the side of circular top plate 42. When UP button 78 is pressed, a relay on a relay board 84 is connected to control motor 74 to raise rod 52 of piston 48, and when DOWN button 80 is pressed, a relay on a relay board 82 is connected to control motor 74 to lower rod 52 of piston 48. In addition to, or alternatively thereto, a key switch 82 can be provided for receiving a key, which when turned, toggles motor 74 to provide a reverse operation. For example, if inner support 22 is raised, turning of the key will lower inner support 22, and vice versa. Key switch 82 would preferably be used in a commercial establishment to prevent mischievous tampering.

Thus, with the present invention described above, raisable pedestal 10 allows for electronic devices to be positioned outside and to be retracted by the user when not used, for example, during nighttime or inclement weather.

In accordance with another aspect of the present invention, a rain sensor 86 is mounted flush with the upper surface of upper plate 38, and is therefore sealed when inner support 22 is lowered. When inner support 22 is raised, as shown in FIGS. 2 and 3, rain sensor 86 detects the presence of precipitation. If precipitation is detected, rain sensor 86 activates a relay on relay board 84 to control motor 74 to automatically lower inner support 22 and thereby protect electronic components 64. Of course, it will be appreciated that rain sensor 86 could alternatively be mounted on inner support 22.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention defined by the appended claims.

What is claimed is:

1. A raisable pedestal comprising:
    an enclosed housing adapted to be fixed to a ground surface;
    a guide arrangement mounted within said housing;
    an inner support mounted for movement along said guide arrangement between a retracted position entirely within said housing and an extended position extending out from said housing, said inner support including an arrangement for supporting electronic components in a manner to render said electronic components accessible when said inner support extends out from said housing;
    a driving arrangement for moving said inner support along said guide arrangement between said retracted and extended positions;
    a precipitation sensor mounted on one of said housing and inner support, for detecting precipitation; and
    a control connected with said sensor and said driving arrangement for controlling said driving arrangement to move said inner support to said retracted position when said sensor detects precipitation in order to protect the electronic components supported by said inner support form the precipitation.

2. A raisable pedestal according to claim 1, wherein said guide arrangement includes a plurality of guide rods extending upwardly relative to the ground surface.

3. A raisable pedestal according to claim 2, wherein said inner support includes a shell slidably along said guide rods.

4. A raisable pedestal according to claim 3, wherein said shell includes side walls and at least one opening in a front wall thereof for receiving the electronic components.

5. A raisable pedestal according to claim 4, wherein said arrangement for supporting the electronic components includes a rack connected to at least one side wall of said shell adjacent said at least one opening.

6. A raisable pedestal according to claim 3, wherein said shell includes a top plate which closes off an upper end of said enclosed housing when said inner support is in said retracted position.

7. A raisable pedestal according to claim 6, wherein said top plate includes a seal therearound for providing a seal between said top plate and the upper end of said enclosed housing.

8. A raisable pedestal according to claim 6, wherein said precipitation sensor is mounted to the upper end of said housing and covered by said top plate when said inner support is in said retracted position.

9. A raisable pedestal according to claim 1, wherein said driving arrangement is movable with said inner support along said guide arrangement, and further comprising a spring arrangement positioned below said inner support for providing a counter-balance to said inner support to prevent crushing of an item placed between said inner support and said housing when said inner support is moved to said retracted position.

10. A raisable pedestal according to claim 1, wherein further comprising at least one switch for controlling said driving arrangement to move said inner support between said retracted and extended positions.

11. A raisable pedestal according to claim 1, wherein said driving arrangement includes a piston having an extensible and retractable rod having a free end connected with said inner shell for moving said inner shell along said guide rods between said retracted and extended positions.

12. A raisable pedestal comprising:
   an enclosed housing adapted to be fixed to a ground surface;
   a plurality of guide rods extending upwardly relative to the ground surface and mounted within said housing;
   an inner support mounted for movement along said guide arrangement between a retracted position entirely within said housing and an extended position extending out from said housing, said inner support including:
      a shell having side walls and at least one opening in a front wall thereof for receiving electronic components,
      a rack connected to at least one side wall adjacent said at least one opening, in a manner to render said electronic components accessible when said inner support extends out from said housing,
      a top plate which closes off an upper end of said enclosed housing when said inner support is in said retracted position, and
      a seal at an underside of said top plate for providing a seal between said top plate and the upper end of said enclosed housing,
   a driving arrangement for moving said inner support along said guide arrangement between said retracted and extended positions, said driving arrangement including a piston having an extensible and retractable rod having a free end connected with said inner shell for moving said inner shell along said guide rods between said retracted and extended positions;
   a precipitation sensor mounted to an upper end of said housing for detecting precipitation and covered by said top plate when said inner support is in said retracted position;
   a control connected with said sensor and said driving arrangement for controlling said driving arrangement to move said inner support to said retracted position when said sensor detects precipitation in order to protect the electronic components supported by said inner support from the precipitation; and
   at least one switch for controlling said driving arrangement to move said inner support between said retracted and extended positions.

13. A raisable pedestal according to claim 12, wherein said driving arrangement is movable with said inner support along said guide arrangement, and further comprising a spring arrangement positioned below said inner shell for providing a counter-balance to said inner support to prevent crushing of an item placed between said inner support and said housing when said inner support is moved to said retracted position.

\* \* \* \* \*